(12) United States Patent
Koka et al.

(10) Patent No.: US 8,824,496 B2
(45) Date of Patent: Sep. 2, 2014

(54) TWO-PHASE ARBITRATION MECHANISM FOR SHARED OPTICAL LINKS

(75) Inventors: Pranay Koka, Austin, TX (US); Michael Oliver McCracken, Austin, TX (US); Herbert Dewitt Schwetman, Jr., Austin, TX (US); Xuezhe Zheng, San Diego, CA (US); Ashok Krishnamoorthy, San Diego, CA (US)

(73) Assignee: Oracle America, Inc., Redwood City, CA (US)

( * ) Notice: Subject to any disclaimer, the term of this patent is extended or adjusted under 35 U.S.C. 154(b) by 846 days.

(21) Appl. No.: 12/610,124

(22) Filed: Oct. 30, 2009

(65) Prior Publication Data

US 2011/0103397 A1     May 5, 2011

(51) Int. Cl.
*H04L 12/43* (2006.01)
(52) U.S. Cl.
USPC ........................................................ 370/458
(58) Field of Classification Search
USPC ........................................................ 370/458
See application file for complete search history.

(56) References Cited

U.S. PATENT DOCUMENTS

| | | | |
|---|---|---|---|
| 4,535,330 A | 8/1985 | Carey et al. |
| 4,580,872 A | 4/1986 | Bhatt et al. |
| 4,809,264 A | 2/1989 | Abraham et al. |
| 5,541,914 A | 7/1996 | Krishnamoorthy et al. |
| 5,602,663 A | 2/1997 | Hamaguchi et al. |
| 5,742,585 A | 4/1998 | Yamamoto et al. |
| 5,943,150 A | 8/1999 | Deri et al. |
| 6,021,263 A | 2/2000 | Kujoory et al. |
| 6,289,021 B1 | 9/2001 | Hesse |
| 6,487,643 B1 | 11/2002 | Khare et al. |
| 6,618,379 B1 | 9/2003 | Ramamurthy et al. |
| 6,633,542 B1 | 10/2003 | Natanson et al. |
| 6,665,495 B1 | 12/2003 | Miles et al. |
| 6,873,796 B1 | 3/2005 | Nakahira |
| 6,910,088 B2 | 6/2005 | LaBerge |
| 7,298,974 B2 | 11/2007 | Tanobe et al. |
| 7,336,900 B2 | 2/2008 | DeCusatis et al. |
| 7,403,473 B1 | 7/2008 | Mehrvar et al. |
| 7,490,189 B2 | 2/2009 | Eberle et al. |
| 7,804,504 B1 | 9/2010 | Agarwal |

(Continued)

OTHER PUBLICATIONS

Vantrease, D., et al., "Corona: System Implications for Emerging Nanophotonic Technology", International Symposium on Computer Architecture, IEEE, Jun. 2008, 12 pages.

(Continued)

*Primary Examiner* — Jason Mattis
*Assistant Examiner* — Adnan Baig
(74) *Attorney, Agent, or Firm* — Osha Liang LLP

(57) ABSTRACT

A method for arbitration in an arbitration domain. The method includes: receiving, by each node of a plurality of nodes in the arbitration domain, an arbitration request from each sending node of the plurality of nodes in the arbitration domain, where the plurality of nodes in the arbitration domain each use a shared data channel to send data to a set of receiving nodes; assigning, by each node in the arbitration domain, consecutive time slots to each sending node based on a plurality of priorities assigned to the plurality of nodes in the arbitration domain; for each time slot: sending, from the arbitration domain, a switch request to a receiving node designated by the sending node, where the receiving node is in the set of receiving nodes; and sending, by the sending node, data to the receiving node via the shared data channel during the time slot.

17 Claims, 11 Drawing Sheets

(56) References Cited

U.S. PATENT DOCUMENTS

| | | | |
|---|---|---|---|
| 7,957,381 B2 * | 6/2011 | Clermidy et al. | 370/392 |
| 8,014,671 B1 | 9/2011 | Stevens | |
| 8,340,517 B2 | 12/2012 | Shacham et al. | |
| 2002/0163693 A1 | 11/2002 | Rubissa et al. | |
| 2003/0214962 A1 | 11/2003 | Allaye-Chan et al. | |
| 2004/0037558 A1 | 2/2004 | Beshai | |
| 2005/0129055 A1 * | 6/2005 | Hall et al. | 370/461 |
| 2006/0007859 A1 | 1/2006 | Kadambi et al. | |
| 2006/0095634 A1 | 5/2006 | Meyer | |
| 2006/0251421 A1 | 11/2006 | Arnon | |
| 2009/0046572 A1 | 2/2009 | Leung | |
| 2009/0168782 A1 | 7/2009 | Beshai | |
| 2009/0169205 A1 | 7/2009 | Bergman et al. | |
| 2010/0226308 A1 * | 9/2010 | Haverty | 370/328 |
| 2010/0266276 A1 | 10/2010 | Zheng et al. | |
| 2011/0103799 A1 | 5/2011 | Shacham et al. | |
| 2011/0206377 A1 | 8/2011 | Binkert et al. | |
| 2013/0016970 A1 | 1/2013 | Koka et al. | |
| 2013/0016980 A1 | 1/2013 | Koka et al. | |

OTHER PUBLICATIONS

Wang, H., et al, "Nanophotonic Optical Interconnection Network Architecture for On-Chip and Off-Chip Communications", OFC/NFOEC Feb. 2008, IEEE, 3 pages.

Krishnamoorthy, A. V., Ho, R., Zheng, X., Schwetman, H., Lexau, J., Koka, P., Li, G., Shubin I., Cunningham, J. E., "Computer Systems Based on Silicon Photonic Interconnects", Proceedings of the IEEE, vol. 97, No. 7, Jul. 2009, 25 pages.

Chae, C., Wong, E., and Tucker, R. S., "Optical CSMA/CD Media Access Scheme for Ethernet Over Passive Optical Network", IEEE Photonic Technology Letters, May 2002, 3 pages.

Desai, B. N., "An Optical Implementation of a Packet-Based (Ethernet) MAC in a WDM Passive Optival Network Overlay", Mar. 2001, 3 pages.

Qin, X., and Yang, Y., "Nonblocking WDM Switching Networks with Full and Limited Wavelength Conversion", IEEE Transactions on Communications, Dec. 2002, 10 pages.

Shacham, A., Bergman, K., and Carloni, L. P., "On the Design of a Photonic Network-on-Chip", First International Symposium on Networks-on-Chip, May 2007, 12 pages.

Yang, Y., and Wang, J., "Designing WDM Optical Interconnects with Full Connectivity by Using Limited Wavelength Conversion", IEEE Transactions on Computers, Dec. 2004, 10 pages.

Batten, C., et al., "Building Manycore Processor-to-DRAM Networks with Monolithic Silicon Photonics", Proceedings of the 16th Symposium on High Performance Interconnects (HOTI-16) Aug. 2008, 10 pages.

Todd, T., "Photonic Multihop Bus Networks.", INFOCOM '91, Proceedings, Apr. 7-11, 1991, 10 pages.

* cited by examiner

TWO-PHASE ARBITRATION MECHANISM FOR SHARED OPTICAL LINKS

STATEMENT REGARDING FEDERALLY SPONSORED RESEARCH OR DEVELOPMENT

This invention was made with Government Support under Agreement No. HR0011-08-9-0001 awarded by DARPA. The Government has certain rights in the invention.

BACKGROUND

As current designs close in on the physical limits of semiconductor based microprocessors, new problems, such as increased heat dissipation and power consumption, have prompted designers to consider alternatives to the traditional single die microprocessor. Accordingly, designers may employ parallel processing systems that include multiple microprocessors working in parallel in order to surpass the physical limits of a single processor system. However, such parallel systems with multiple processors place a different set of constraints on designers. For example, because each processor may be working on an independent task, more requests to memory, or other processors, may need to be issued. It may also be necessary to share information among the processors. Accordingly, the input/output ("I/O") bandwidth requirements for a system with multiple processors may be much higher than for a single processor system.

SUMMARY

In general, in one aspect, the invention relates to a method for arbitration in an arbitration domain. The method comprises: receiving, by each node of a plurality of nodes in the arbitration domain, an arbitration request from each sending node of the plurality of nodes in the arbitration domain, wherein the plurality of nodes in the arbitration domain each use a shared data channel to send data to a set of receiving nodes; assigning, by each node in the arbitration domain, consecutive time slots to each sending node based on a plurality of priorities assigned to the plurality of nodes in the arbitration domain; for each time slot: sending, from the arbitration domain, a switch request to a receiving node designated by the sending node, wherein the receiving node is in the set of receiving nodes; and sending, by the sending node, data to the receiving node via the shared data channel during the time slot.

In general, in one aspect, the invention relates to a system for arbitration in an arbitration domain. The system comprises: a set of receiving nodes comprising a receiving node configured to receive data; and an arbitration domain comprising a plurality of nodes having a shared data channel to send the data to the set of receiving nodes, wherein the plurality of nodes in the arbitration domain is configured to: receive, by each node of the plurality of nodes in the arbitration domain, an arbitration request from each sending node of the plurality of nodes in the arbitration domain; assign, by each node in the arbitration domain, consecutive time slots to each sending node based on a plurality of priorities assigned to the plurality of nodes in the arbitration domain; for each time slot: send, from the arbitration domain, a switch request to the receiving node designated by the sending node; and send, by the sending node, data to the receiving node via the shared data channel during the time slot.

In general, in one aspect, the invention relates to a computer system comprising an integrated circuit. The integrated circuit comprises: a set of receiving nodes comprising a receiving node configured to receive data; and an arbitration domain comprising a plurality of nodes having a shared data channel to send the data to the set of receiving nodes, wherein the plurality of nodes in the arbitration domain is configured to: receive, by each node of the plurality of nodes in the arbitration domain, an arbitration request from each sending node of the plurality of nodes in the arbitration domain; assign, by each node in the arbitration domain, consecutive time slots to each sending node based on a plurality of priorities assigned to the plurality of nodes in the arbitration domain; for each time slot: send, from the arbitration domain, a switch request to the receiving node designated by the sending node; and send, by the sending node, data to the receiving node via the shared data channel during the time slot.

Other aspects of the invention will be apparent from the following description and the appended claims.

DETAILED DESCRIPTION

Figure 1:
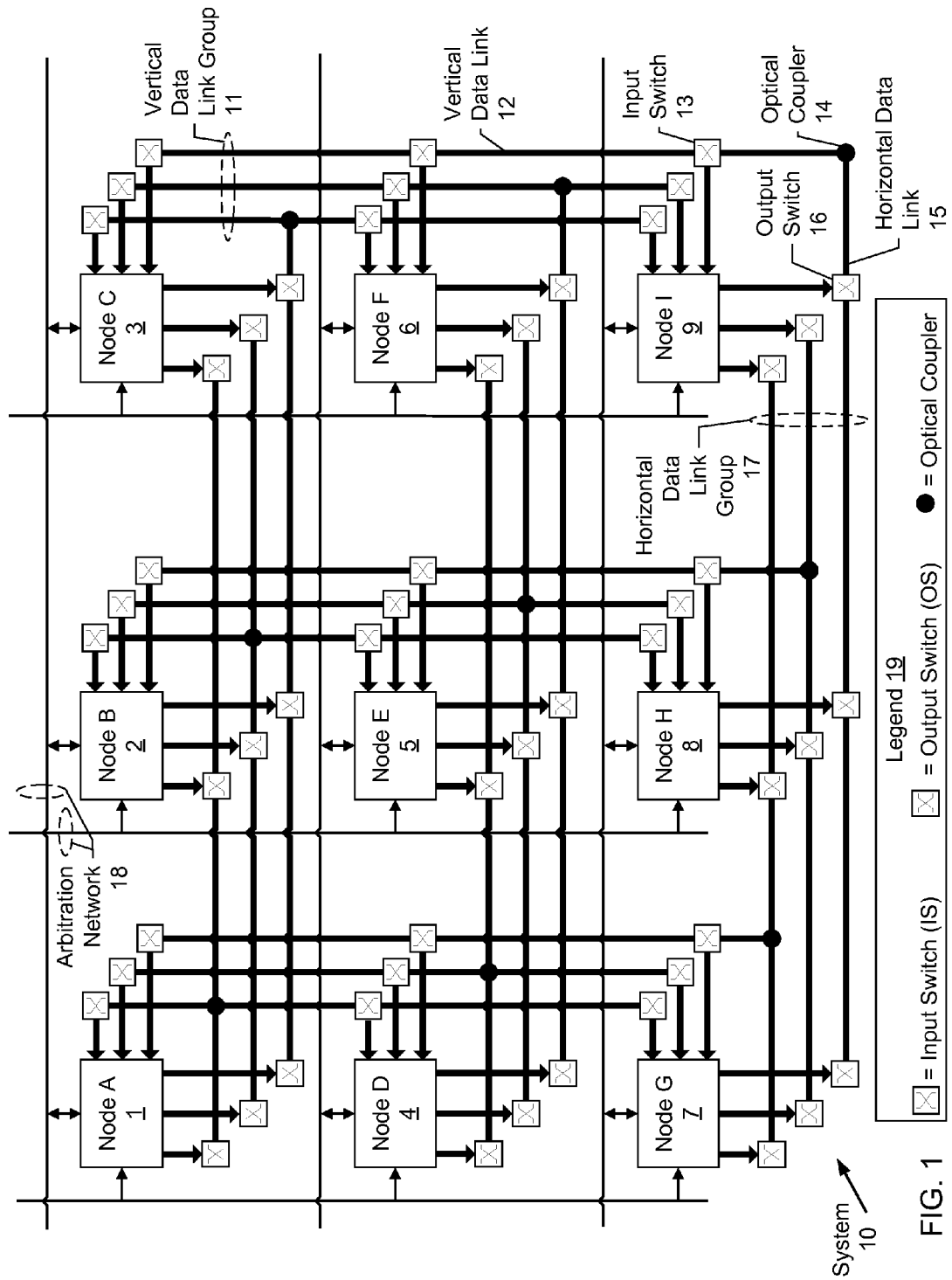
FIGS. 1 and 2 show schematic diagrams of data networks in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus for arbitration amongst multiple nodes in an arbitration domain. An arbitration domain is a group of nodes that require arbitration to send data to at least one receiving node. Specifically, a data path exists between any two nodes to allow one of the two nodes to send data to the other node. One or more segments of a data path may intersect with other data paths. The multiple data paths that intersect form a data channel. Accordingly, a data channel connects a group of nodes configured to send data to a set of receiving nodes. The set of receiving nodes may be composed of a single node or multiple nodes. In one or more embodiments of the invention, a separate arbitration domain exists for each data channel. The nodes in the arbitration domain are the transmitting nodes connected to the data channel. Accordingly, embodiments of the invention provide a method and apparatus for arbitration amongst the nodes in the arbitration domain.

For example, consider the scenario in which (i) the data paths between a receiving node X and a group of sending nodes intersect; and (ii) the data paths between a receiving node Z and the group of sending nodes intersect. In the example, the group of sending nodes each belong to at least two arbitration domains (i.e., one arbitration domain for the set of receiving nodes containing node X and another arbitration domain for the set of receiving nodes containing node Z). The first arbitration domain allows the group of nodes to arbitrate for time slots in which to send data to the set of receiving nodes containing node X. Similarly, the second arbitration domain allows the group of nodes to arbitrate for time slots in which to send data to the set of receiving nodes containing node Z.

In general, embodiments of the invention perform the arbitration using a two phase arbitration mechanism. In the first phase of the arbitration, during an arbitration interval, the sending nodes (i.e., the nodes wanting to send data during the sending interval being arbitrated) broadcast an arbitration request to all nodes in the arbitration domain. The nodes in the arbitration domain use a predefined ordering of nodes to assign the sending nodes to consecutive time slots in the sending interval. In the second phase of arbitration, during the sending interval, a node from the arbitration domain sends a switch request to a receiving node to inform the receiving node that it is about to receive data. The sending node then sends the data to the receiving node. The sending node and the node sending the switch request may be the same node. Alternatively, the sending node and the node sending the switch request may be different nodes.

FIG. 1 shows a system (10) in accordance with one or more embodiments of the invention. As shown in FIG. 1, the system (10) includes nodes (e.g., node A (1)-node I (9)), a data network (i.e., an optical data network) (designated in FIGS. 1-4 by the thick black lines) and an arbitration network (18) (designated in FIGS. 1-4 by thin black lines).

In one or more embodiments of the invention, the system (10) corresponds to a macro-chip architecture based on optical data communication. The macro-chip architecture may include a silicon photonic optical network. Specifically, optical data links (e.g., vertical data link group (11), horizontal data link group (17)) in the silicon photonic optical network are shared between nodes (e.g., node A (1)-node I (9)) of the macro-chip by dynamically switching the optical data links between different sources (i.e., sending nodes) and destinations (i.e., receiving nodes) in the macro-chip. For example, the silicon photonic optical network may be a switched optical network that uses a 1×2 broadband optical switching element.

Each of the nodes (e.g., node A (1)-node I (9)) in the system (10) may correspond to a die (e.g., semiconductor die). In one or more embodiments of the invention, each die may include one or more processors and/or one or more cache memories. Further, all nodes (e.g., node A (1)-node I (9)), may be disposed on a single chip (e.g., a macro-chip) as part of a larger mesh structure.

As discussed above, the nodes (e.g., node A (1)-node I (9)) are operatively coupled using a data network. The data network includes shared optical data link groups (e.g., vertical data link group (11), horizontal data link group (17)) for the transmission of data. An optical data link group (e.g., vertical data link group (11), horizontal data link group (17)) is a collection of data links (e.g., vertical data link (12), horizontal data link (15)). For example, the vertical data link group (11) is composed of vertical data links (e.g., 12) in a single column. The horizontal data link group (17) is composed of horizontal data links (e.g., 15) in a single row.

Each data link (e.g., vertical data link (12), horizontal data link (15)) includes one or more waveguides. A waveguide is configured to transmit optical signals carrying/representing data. The optical signals may be transmitted on various wavelengths as specified by the sender of the data. Data travels from one node to another node along the data waveguides. The path of the data from one node to another node forms a data path. When multiple data paths intersect (i.e., have at least one data link in common), the intersecting data paths form a data channel. Because the data paths intersect, the nodes (e.g., node A (1)-node I (9)) sending the data must arbitrate to determine which node will use the common data channel. The arbitration is performed using the arbitration network (18) to allocate usage of the shared optical data links. The arbitration network is discussed in more detail below and in FIGS. 3 and 4.

Continuing with FIG. 1, a vertical data link (e.g., 12) connects to a horizontal data link (e.g., 15) using optical couplers (e.g., 14). As shown in the legend (19) on FIG. 1, the optical coupler is designated by a black circle. An optical coupler (e.g., 14) is configured to redirect all wavelengths sent on one data waveguide to another data waveguide. For example, optical coupler (14) is configured to redirect all wavelengths sent on horizontal data link (15) to vertical data link (12).

Furthermore, nodes (e.g., node A (1)-node I (9)) connect to the data network via input switches and output switches as shown in FIG. 1 and in the legend (19). For example, the node I (9) is coupled to the horizontal data link (15) via the output switch (16). Node I (9) is coupled to the vertical data link (12) via the input switch (13). Thus, node I (9) sends data via the output switch (16) and receives data via the input switch (13). An input switch (e.g., 13) is a tunable device that can be tuned by the receiving node to receive optical signals of a particular wavelength (or within a small range of wavelengths). As discussed above, the optical signals carry/represent data transmitted by the sending node. The input switch (e.g., 13) includes functionality to transmit the data received on the data link to the receiving node. Similarly, an output switch (e.g., 16) is configured to transmit data sent by the sending node on the data link.

Although not specifically shown in FIG. 1, a node row is all of the nodes in a single row. For example, node A (1), node B (2), and node C (3) form node row 0. Likewise, node D (4), node E (5), and node F (6) form node row 1. Also, node G (7), node H (8) and node I (9) form node row 2. A node column is all of the nodes in a single column. For example, node A (1), node D (4), and node G (7) form node column 0. Likewise, node B (2), node E (5), node H (8) form node column 1. Also, node C (3), node F (6), and node I (9) form node column 2. In this context, the horizontal data link group (17) and the horizontal data link (15) are referred to as being associated with the node row 2 while the vertical data link group (11) and the vertical data link (12) are referred to as being associated with the node column 2.

In one or more embodiments of the invention, the architecture of the system (10) shown in FIG. 1 creates multiple arbitration domains for each node in each row. Specifically, the nodes of a node row must arbitrate for time slots to communicate with the nodes in a single node column. For example, node row 0 shares data links to communicate with nodes in node column 0, shares different data links to communicate with nodes in node column 1, and shares other different data links to communicate with nodes in node column 2. Nodes in node row 1 similarly share data links to communicate with node columns. Likewise, nodes in node row 2 similarly share data links to communicate with node columns.

Therefore, for the data network shown in FIG. 1, each node belongs to a separate arbitration domain for each column. For example, node A belongs to an arbitration domain composed of node A (1), node B (2), and node C (3) to arbitrate for access to node column 0, another arbitration domain composed of node A (1), node B (2), and node C (3) to arbitrate for access to node column 1, and a third arbitration domain arbitration domain composed of node A (1), node B (2), and node C (3) to arbitrate for access to node column 2.

Although FIG. 1 shows a system having three node rows and three node columns, more or fewer node rows and/or node columns may be used without departing from the scope of the invention. In one or more embodiments of the invention, the number of node rows is equal to the number of node columns. In one or more embodiments of the invention, increases in the number of node rows and node columns may be achieved by adding additional data links, input switches, and output switches.

Figure 2:
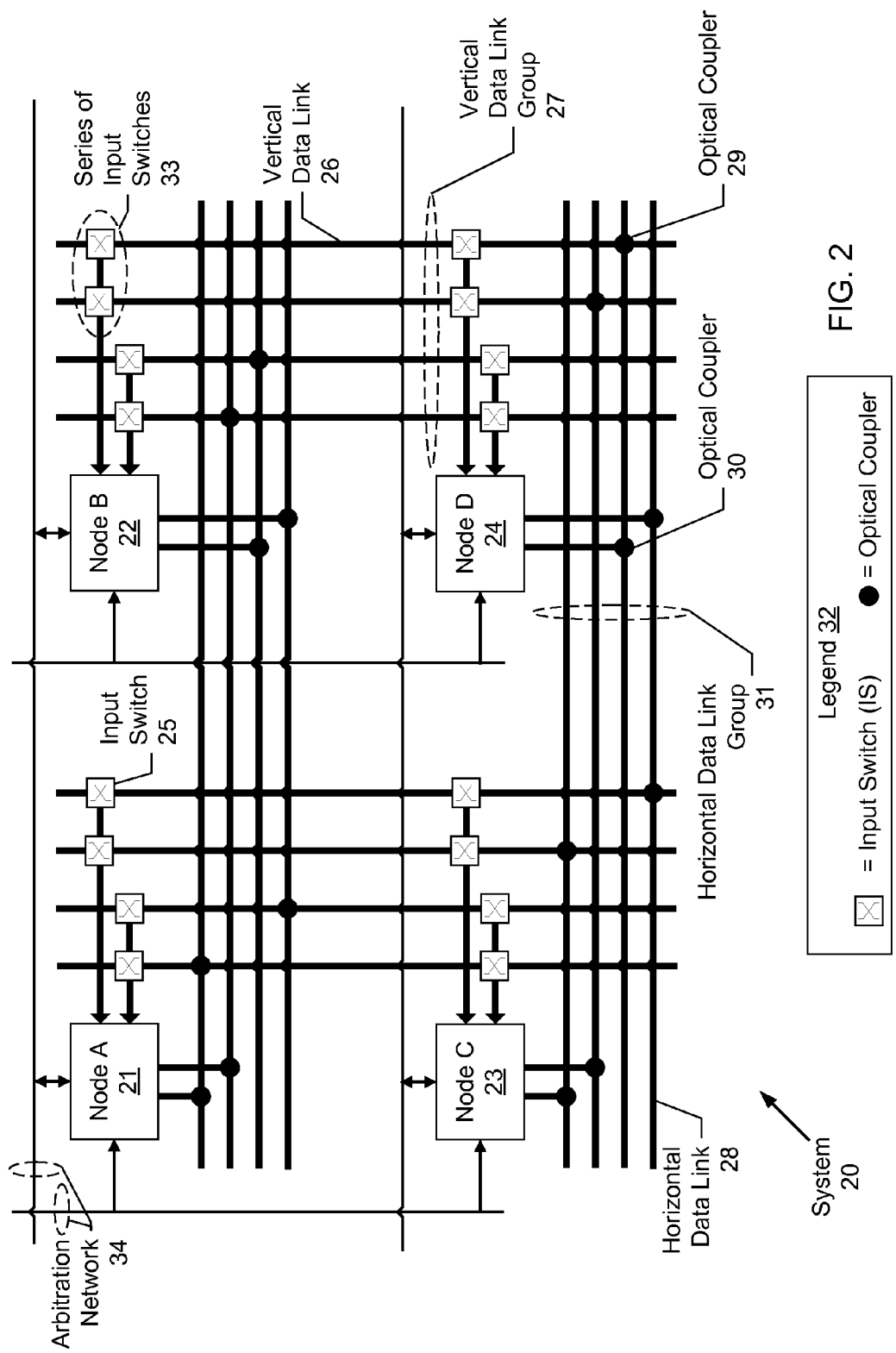

FIG. 2 shows a system (20) in accordance with one or more embodiments of the invention. The system (20) includes a different data network (i.e., optical data network) than the network shown in FIG. 1. As shown in FIG. 2, the system (20) includes an array of nodes (e.g., node A (21), node B (22), node C (23), node D (24)) operatively coupled using shared optical data links. Nodes (e.g., node A (21)-node D (24)), node rows, node columns, data link groups (e.g., horizontal data link group (31), vertical data link group (27)), and data links (e.g., horizontal data link (28), vertical data link (26)) are similar to the nodes, node rows, node columns, data link groups, and data links, respectively, as described with respect to FIG. 1 above. Moreover, nodes (e.g., node A (21)-node D (24)) in FIG. 2 are configured to communicate with the data network shown in FIG. 2.

Continuing with FIG. 2, in one or more embodiments of the invention, each node is coupled to a horizontal data link (e.g., 28) via an optical coupler (e.g., 30). The legend (32) identifies the symbols for both input switches and the optical couplers. The optical coupler allows the node to transmit data on the horizontal data link (e.g., 28). Specifically, the optical coupler (e.g., 30) redirects the optical signal(s) from the node to the horizontal data link (e.g., 28).

Further, each node is coupled to a vertical data link (e.g., 26) via an input switch (e.g., 25). Specifically, in the data network shown in FIG. 2, each input port (not shown) on the node is connected to a series of input switches (e.g., 33). In one or more embodiments of the invention, the number of switches in the series is dependent on the number of node rows. Additional node columns may be added to the data network without departing from the scope of the invention. For example, additional node columns may be added to the system shown in FIG. 2 by adding additional horizontal and vertical waveguides and adding another switch in each of the series of switches. Further, additional node rows may be added by adding an additional series of switches, connecting another input port of the node to the additional series of switches, and adding corresponding horizontal and vertical waveguides.

In one or more embodiments of the invention, the data paths connecting a single receiver node with the nodes of a node row intersect. Specifically, all nodes in a node row connect to the same input port on the receiving node. Therefore, the data paths from the nodes in a node row intersect when sending data to a node at the series of switches. Because the data paths intersect, the data paths form a data channel from the nodes in the node row to the particular receiving node. Therefore, all nodes in a node row are in an arbitration domain for the data channel intersecting at the receiving node. Moreover, in one or more embodiments of the invention, a separate arbitration domain exists for each receiving node. Thus, all the nodes in the node row each belong to a number of arbitration domains, and the number of arbitration domains equals the number of possible receiving nodes. In one or more embodiments of the invention, each node is with the same group of nodes in each of the arbitration domains of which the node is a member. The arbitration network (34) is configured to enable arbitration amongst nodes in the arbitration domain.

Figure 3:
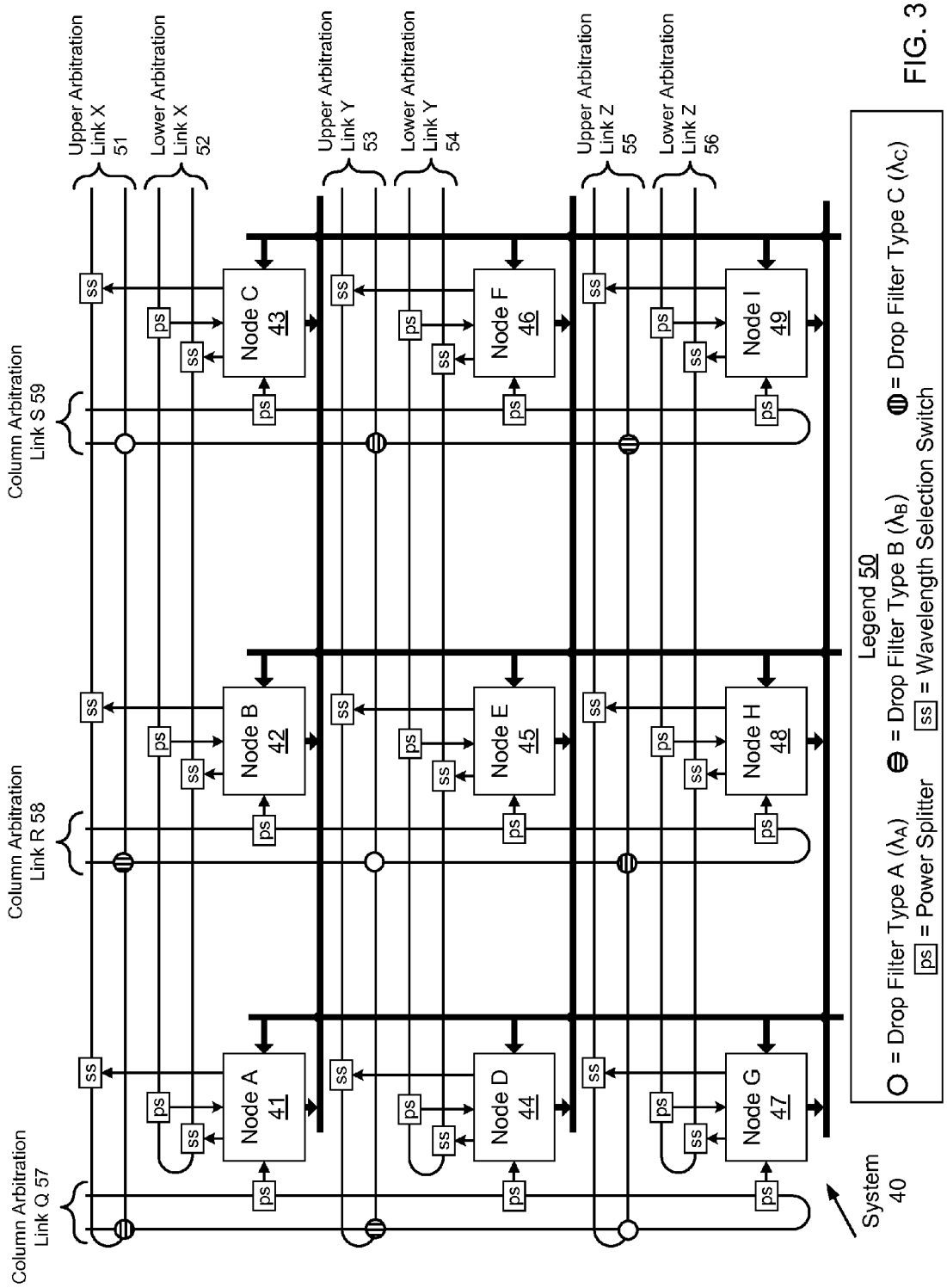
FIGS. 3 and 4 show schematic diagrams of arbitration networks in accordance with one or more embodiments of the invention.
Figure 4:
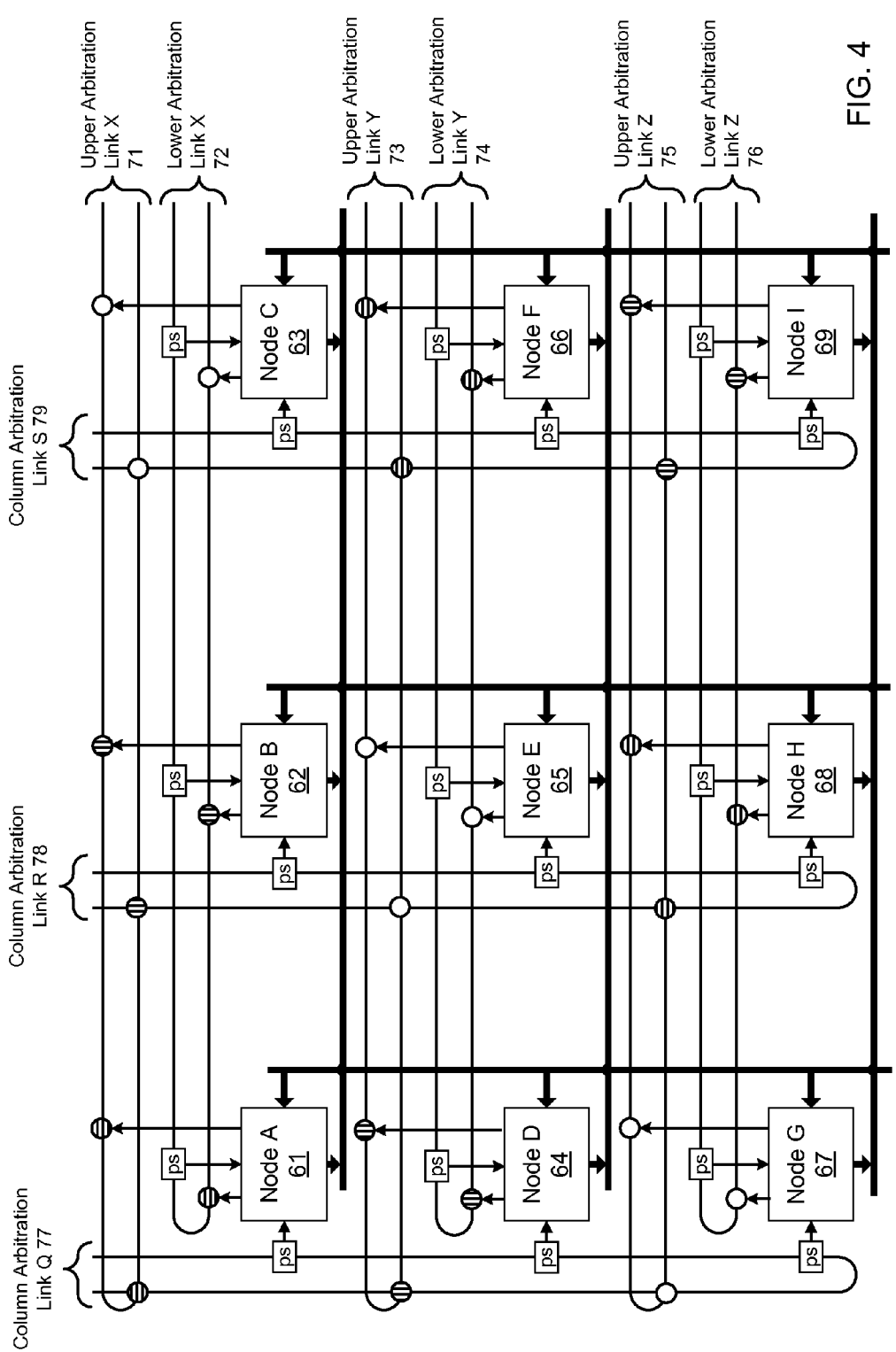

FIGS. 3 and 4 show arbitration networks in accordance with one or more embodiments of the invention. Although FIGS. 3 and 4 show a three by three network, the arbitration networks may be used with virtually any size and type of data network. For example, either arbitration network may be used with either of the data networks shown in FIG. 1 or FIG. 2. In one or more embodiments of the invention, the data networks determine the arbitration domain for the arbitration network. FIGS. 3 and 4 show an arbitration network in which all nodes in the same row are in the same arbitration domain or set of arbitration domains.

FIG. 3 shows an arbitration network in accordance with one or more embodiments of the invention. Specifically, in the arbitration network of FIG. 3, the sending node sends a switch request (discussed below) to the receiving node to prepare the receiving node to receive data. As shown in FIG. 3, each arbitration domain is connected to an upper arbitration link and a lower arbitration link. For example, an arbitration domain that includes node A (41), node B (42), and node C (43) is connected to upper arbitration link X (51) and lower arbitration link X (52). Similarly, an arbitration domain that includes node D (44), node E (45), and node F (46) is connected to upper arbitration link Y (53) and lower arbitration link Y (54). Likewise, an arbitration domain that includes node G (47), node H (48), and node I (49) is connected to upper arbitration link Z (55) and lower arbitration link Z (56).

In one or more embodiments of the invention, each arbitration link (e.g., lower arbitration link, upper arbitration link) includes one or more waveguides. Further, each waveguide includes one or more wavelengths. In one or more embodiments of the invention, the number of waveguides for each arbitration link is dependent on the number nodes in the arbitration domain. A larger system (40) may be built by increasing the number of waveguides, by increasing the number of wavelengths within a waveguide, or a combination of the two.

The lower arbitration link (e.g., lower arbitration link X (52), lower arbitration link Y (54), lower arbitration link Z (56)) connects the nodes in the arbitration domain with each other so that arbitration requests generated by a node in the arbitration domain may be broadcast to all nodes in the same arbitration domain. In one or more embodiments of the invention, a node is connected to the lower arbitration link using a wavelength selection switch, identified in the legend (50). A wavelength selection switch switches an optical signal of a specific wavelength (e.g., $\lambda_A$), or optical signals falling within a small range of wavelengths, in a waveguide from an input port to any of two output ports. In one or more embodiments of the invention, each node transmits data (e.g., arbitration requests) using an optical signal of a node-specific wavelength (i.e., a designated wavelength). In one or more embodiments of the invention, the designated wavelength for each node in the arbitration domain is unique amongst the nodes in the arbitration domain. For example, if node A (41) transmits optical signals (e.g., arbitration requests) using a designated wavelength of $\lambda_X$, then node B (42) and node C (43) do not transmit optical signals (e.g., arbitration requests) using the wavelength $\lambda_X$.

In one or more embodiments of the invention, each node is configured to receive arbitration requests propagating along the lower arbitration link via a power splitter, as identified in the legend (50). In one or more embodiments of the invention, the power splitter is configured to divide the total incoming optical power into two outputs of equal or different optical powers: one output is fed into the node, the other output continues along the lower arbitration link (e.g., lower arbitration link X (52), lower arbitration link Y (54), lower arbitration link Z (56)).

In one or more embodiments of the invention, each node is coupled to an upper arbitration link via a wavelength selection switch. The upper arbitration link (e.g., upper arbitration link X (51), upper arbitration link Y (53), upper arbitration link Z (55)) is connected to a column arbitration link (e.g., column arbitration link Q (57), column arbitration link R (58), column arbitration link S (59)) via a drop filter. In one or more embodiments of the invention, each drop filter is configured to select an optical signal having a predetermined wavelength (e.g., $\lambda_A$, $\lambda_B$, or $\lambda_C$), or a signal having a wavelength falling within a small predetermined range of wavelengths, from the upper arbitration link, and redirect (i.e., drop) the selected optical signal into the column arbitration link.

In one or more embodiments of the invention, each drop filter within the upper arbitration link is configured to redirect (i.e., drop) optical signals of a unique wavelength. In other words, no two drop filters within the same upper arbitration link are configured to drop optical signals of the same wavelength. In one or more embodiments of the invention, each drop filter within a column arbitration link is configured to redirect (i.e., drop) optical signals of a unique wavelength. In other words, no two drop filters within the same column arbitration link are configured to redirect (i.e., drop) optical signals of the same wavelength. Accordingly, by transmitting the switch request on the upper arbitration link using an optical signal of the correct wavelength, the optical signal having the switch request will be redirected (i.e., dropped) into the column arbitration link connected to the receiving node. For example, a switch request from node F (46) to node G (47) may be sent using an optical signal of wavelength $\lambda_C$, corresponding to the wavelength redirected by drop filter of type C. As another example, a switch request from node E (45) to node H (48) may be sent in the wavelength $\lambda_A$, corresponding to the wavelength redirected by drop filter of type A. Although FIG. 3 shows three types of drop filter, more types of drop filters may be used without departing from the scope of the invention.

In one or more embodiments of the invention, nodes are connected to the column arbitration link using a power splitter as shown in legend (50) in FIG. 3. The power splitter is configured to divide the total incoming optical power, including a switch request, into two outputs of equal or different optical powers: one output is fed into the receiving node, the other output continues along the column arbitration link. In one or more embodiments of the invention, the switch request include a row identifier of the receiving node. For example, a switch request from node H (48) to node C (43) may include an identifier of node row 0.

Continuing with FIG. 3, although FIG. 3 uses the terms upper and lower with reference to arbitration links, the actual relative configuration of arbitration links with respect to each other may differ from shown in FIG. 3 without departing from the scope of the invention. For example, the upper arbitration link may be switched with the lower arbitration link in accordance with one or more embodiments of the invention.

FIG. 4 shows an arbitration network in accordance with one or more embodiments of the invention. In the arbitration network shown in FIG. 4, a switch request is transmitted to the receiving node from a node in the same column as the receiving node. In one or more embodiments of the invention, the nodes (e.g., node A (61), node B (62), node C (63), node D (64), node E (65), node F (66), node G (67), node H (68), node I (69)), upper arbitration link (e.g., upper arbitration link X (71), upper arbitration link Y (73), upper arbitration link Z (75)), lower arbitration link (e.g., lower arbitration link X (72), lower arbitration link Y (74), lower arbitration link Z (76)), and column arbitration links (e.g., column arbitration link Q (77), column arbitration link R (78), column arbitration link S (79)), and power splitters are similar to the nodes, upper arbitration links, lower arbitration links, column arbitration links, and power splitters, respectively, shown in FIG. 3.

In the arbitration network shown in FIG. 4, each node transmits optical signals (e.g., switch requests, arbitration requests) using a designated wavelength. The node is connected to a lower arbitration waveguide via a drop filter that is configured to redirect signals in the node's designated wavelength onto the lower arbitration link. Similarly, the node is connected to the upper arbitration link via a drop filter that is configured to redirect signals in the node's designated wavelength onto the upper arbitration link. In one or more embodiments of the invention, the designated wavelength of the node for sending switch requests may be different than the designated wavelength of the node for sending arbitration requests. In one or more embodiments of the invention, each node is assigned to a column arbitration link. In one or more embodiments of the invention, the column arbitration link assigned to the node has a drop filter of the same type as the drop filter on the upper arbitration link connected to the node. In one or more embodiments of the invention, the node assigned to the column arbitration link is connected to the column arbitration link as a receiving node of the column arbitration link.

In one or more embodiments of the invention, in the arbitration domain shown in FIG. 4, a node assigned to a column is configured to send a switch request on behalf of the sending node. For example, if node C (63) wants to send data to node E (65), then node B (62) sends a switch request on behalf of node C (63). In one or more embodiments of the invention, the switch request is sent in the wavelength redirected by drop filter type C. In one or more embodiments of the invention, the switch request in FIG. 4 includes a node identifier of the destination node. Alternatively, the switch request may include the row identifier of the destination node.

Figure 5:
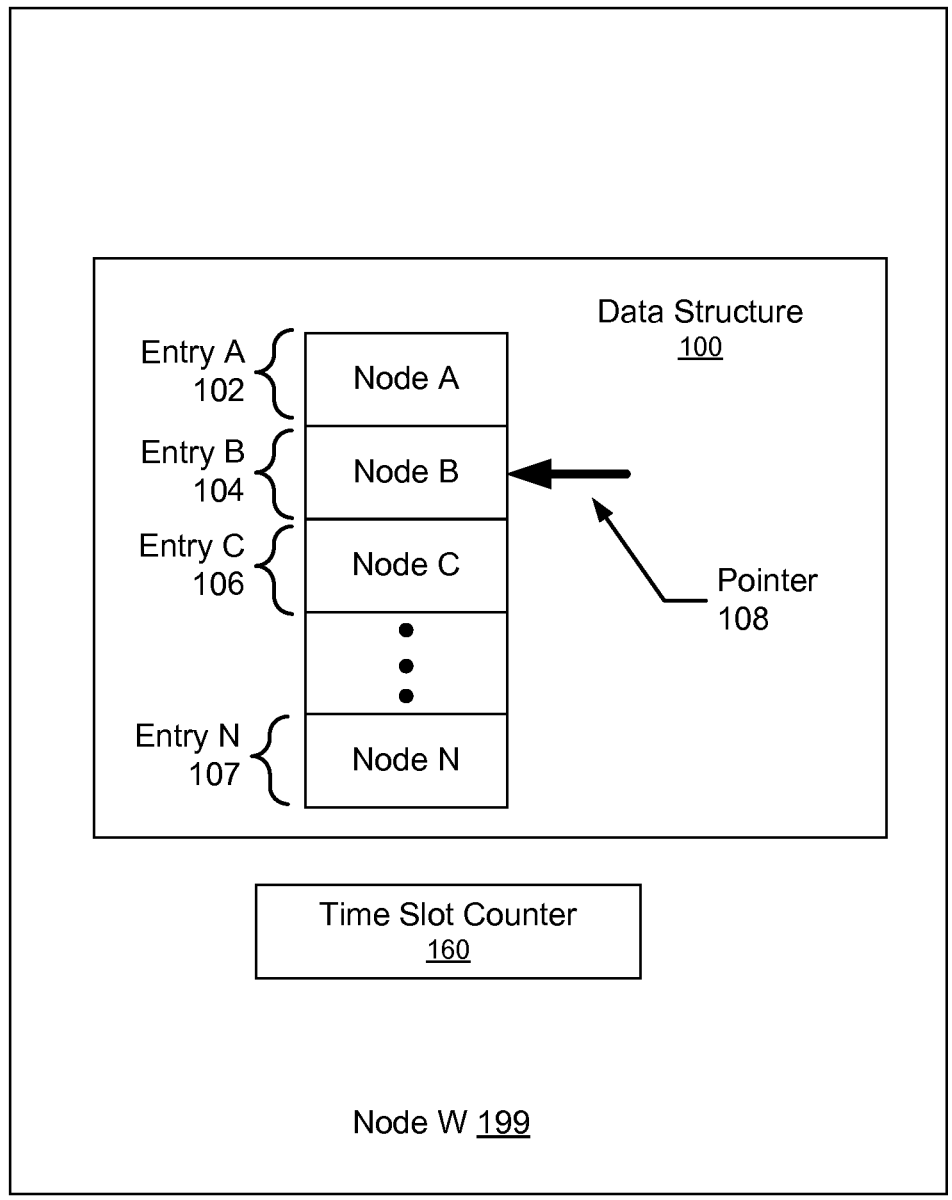
FIG. 5 shows a schematic diagram of a node having a data structure for performing arbitration in accordance with one or more embodiments of the invention.

FIG. 5 shows a node (i.e., Node W (199)) in accordance with one or more embodiments of the invention. The node W (199) may be essentially the same as any of node A (1)-node I (9) and node A (21)-node D (24), discussed above in reference to FIG. 1 and FIG. 2. As shown in FIG. 5, the node W (199) includes a data structure (100) having multiple entries (e.g., entry A (102), entry B (104), entry C (106), entry N (107)). Each entry corresponds to a node in the arbitration domain. Thus, the data structure (100) provides a listing of all nodes in the arbitration domain, including the node W (199). In one or more embodiments of the invention, each and every node within the arbitration domain maintains a copy of the data structure (100). Further, in the event that the node W (199) belongs to multiple arbitration domains, the node W (199) includes multiple data structures (e.g., at least one data structure for each arbitration domain).

In one or more embodiments of the invention, the node W (199) includes a pointer (108) referencing an entry in the data structure (100). Specifically, the pointer (108) identifies the entry, and thus the node within the arbitration domain, having the highest priority for transmitting data. For example, in FIG. 5, the pointer (108) references the entry B (104), corresponding to node B (not shown). Accordingly, the pointer (108) identifies node B as having the highest priority within the arbitration domain for transmitting data. Entries below/after entry B (104) have decreasing priorities within the arbitration domain. In other words, node C has the second highest priority within the arbitration domain for transmitting data. The data structure (100) may be considered a circular list/array. Accordingly, node A (not shown), corresponding to entry A (102), may have the lowest priority within the arbitration domain for transmitting data. Further, node N (not shown), corresponding to entry N (107), may have the second lowest priority within the arbitration domain for transmitting data. After each arbitration interval, the pointer (108) may be incremented, effectively changing the priorities of the nodes within the arbitration domain.

As discussed above, each and every node within the arbitration domain maintains a copy of the data structure. In one or more embodiments of the invention, each and every node within the arbitration domain also includes the pointer (108) identifying the highest priority node, and thus the priorities of all the nodes, within the arbitration domain. Accordingly, upon receiving multiple arbitration requests from sending nodes within the arbitration domain, each node within the arbitration domain, including the sending nodes, locally allocates upcoming time slots to the sending nodes based on the priorities of the sending nodes. Moreover, as node priority is globally known within the arbitration domain, the local allocations performed by each and every node in the arbitration domain are identical. Thus, during the allocation process (i.e., arbitration interval), each sending node effectively assigns itself a time slot for transmitting data according to its priority. This allocation is consistent with the allocations performed by all other nodes within the arbitration domain. Further, the sending node records its allocated time slots and transmits its data during the allocated time slot.

In one or more embodiments of the invention, the node W (199) includes a time slot counter (160). Each and every node within the arbitration domain maintains a copy of the time slot counter (160). The value of the time slot counter (160) may correspond to the next available time slot for data transmission within the arbitration domain. Once a node is assigned to the time slot, the time slot is no longer available and the time slot counter (160) increments. The number of times the time slot counter (160) increments during an arbitration interval corresponds to the number of arbitration requests received during the arbitration interval.

Figure 6:
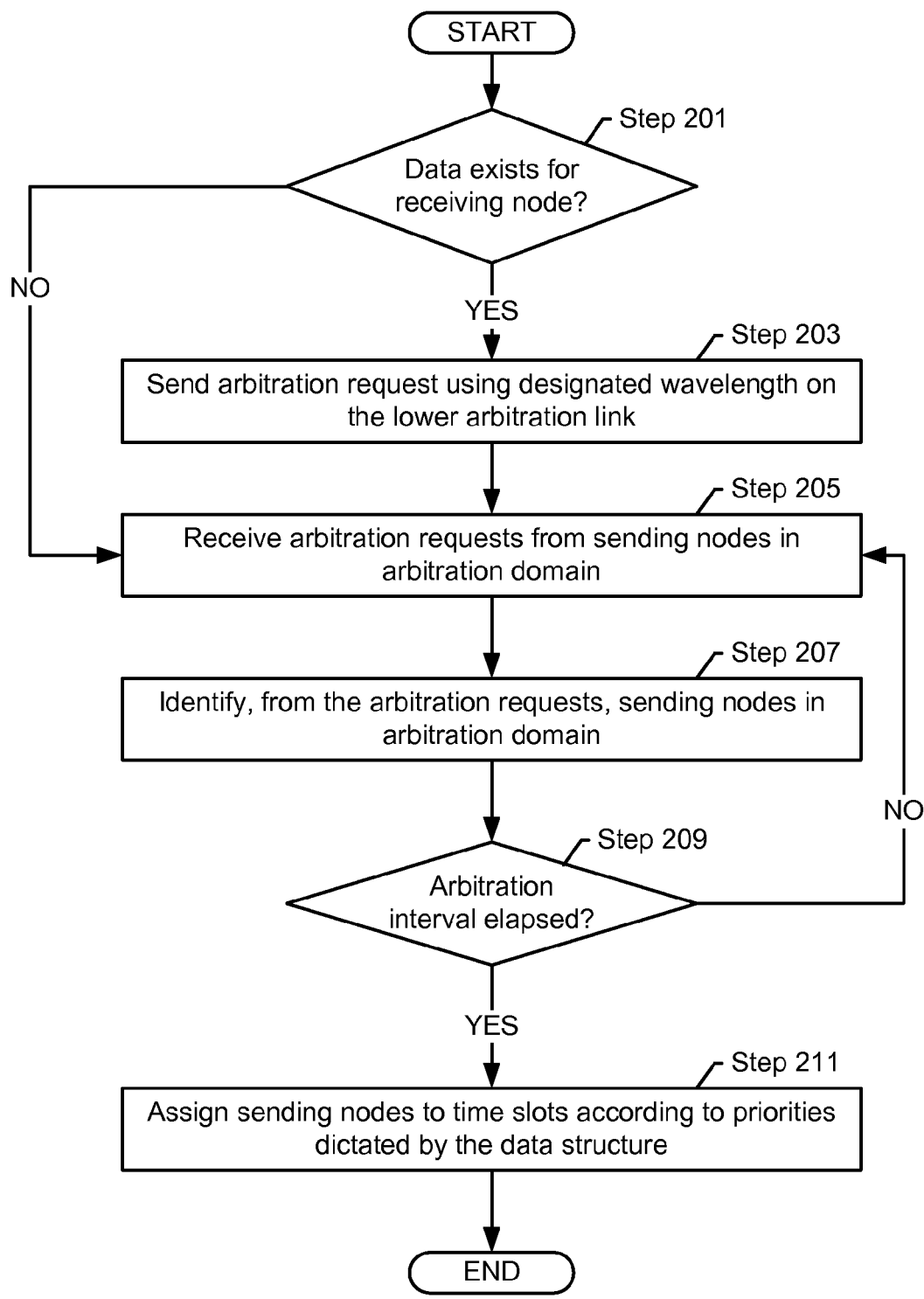
FIGS. 6-8 show flowcharts in accordance with one or more embodiments of the invention.
Figure 7:
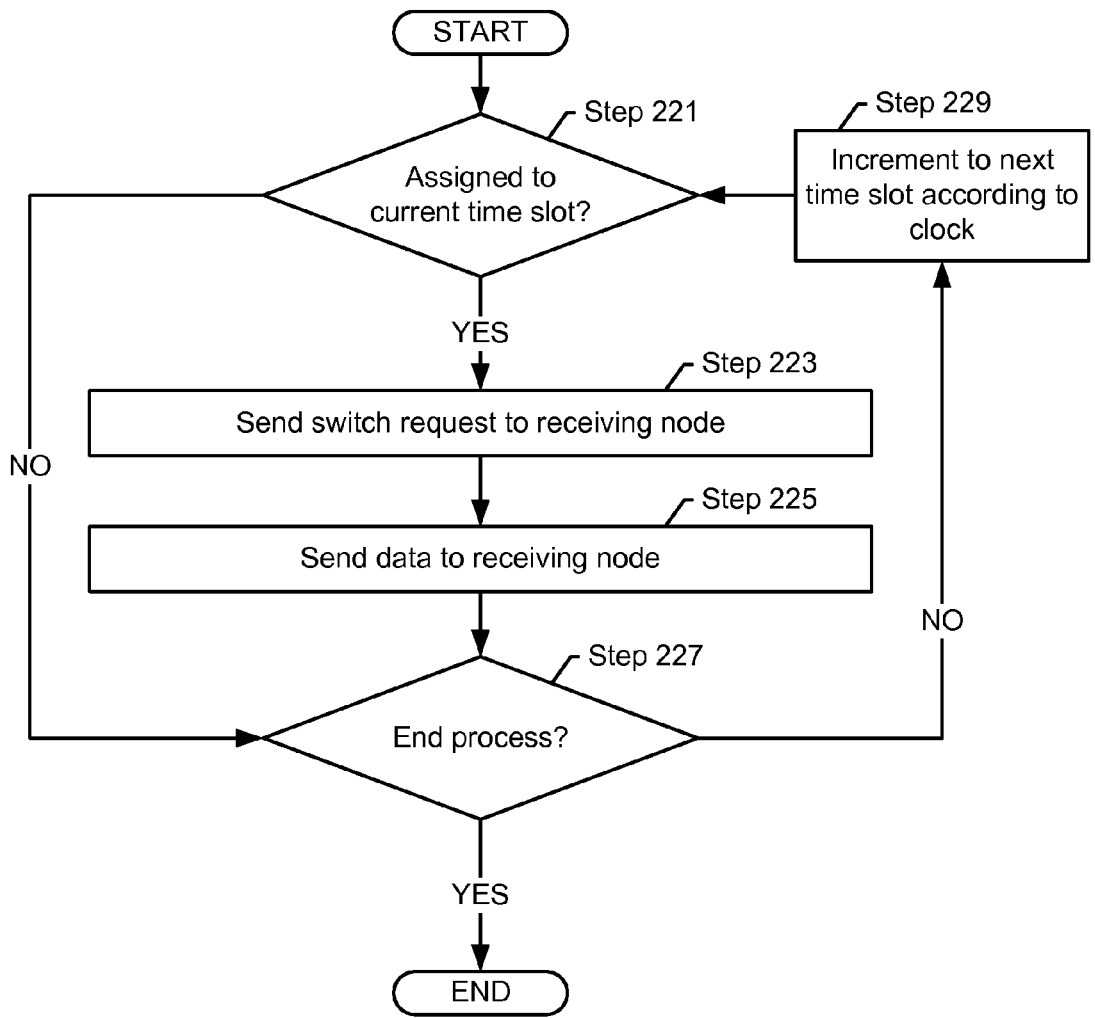
Figure 8:
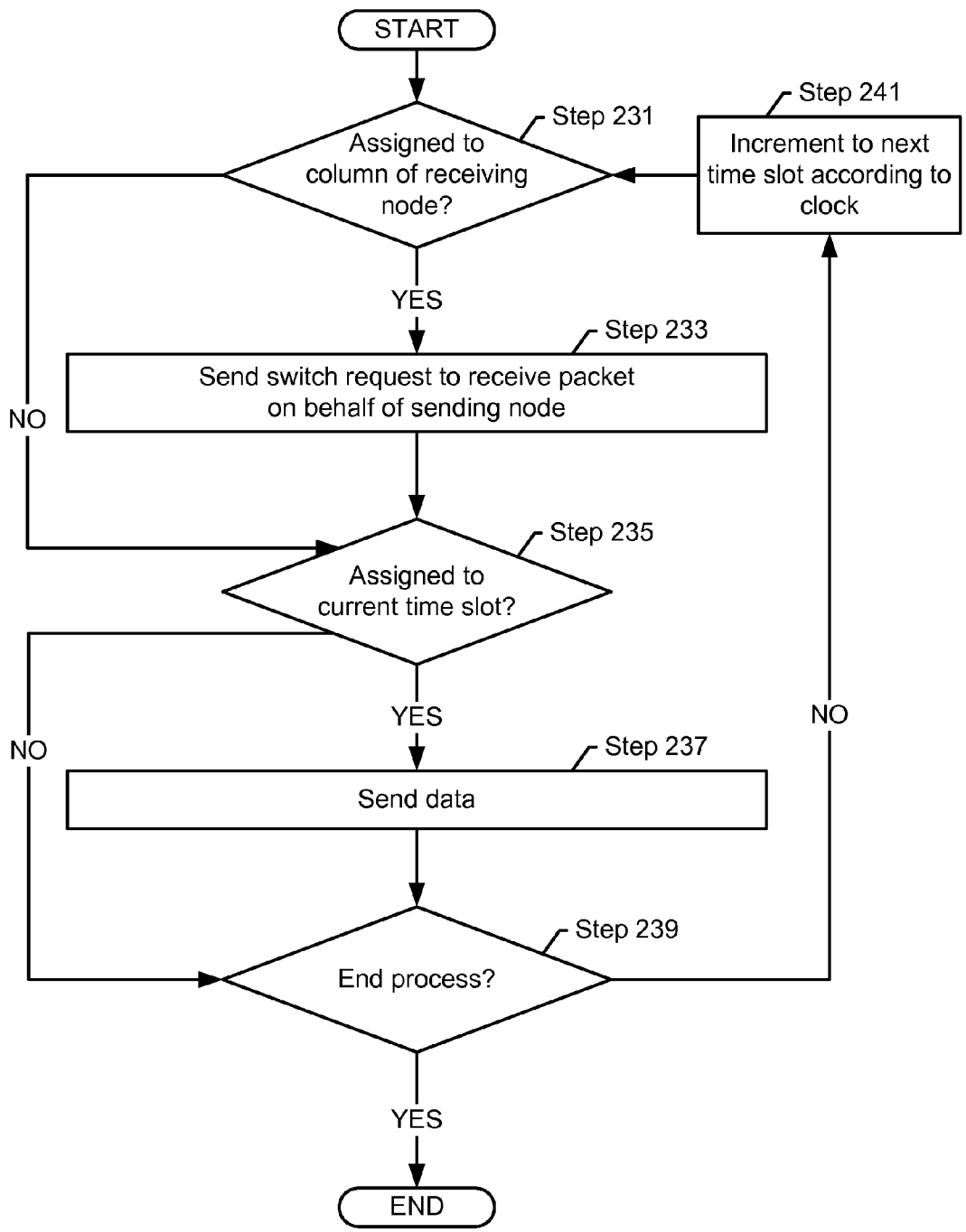

FIGS. 6-8 show flowcharts in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel. The flowcharts shown in FIGS. 6-8 are from the perspective of a node in accordance with one or more embodiments of the invention. In one or more embodiments of the invention, each node performs the steps in the flowcharts for each of the arbitration domains in which the node is a member.

FIG. 6 shows a flowchart for assigning nodes to time slots in accordance with one or more embodiments of the invention. In Step 201, it is determined whether the node has data for transmission to a receiving node. When it is determined the node has data for transmission to a receiving node, the process proceeds to Step 203. However, when it is determined that the node does not have any data for transmission to a receiving node, the process proceeds to Step 205. As discussed above, a node having data to send may be referred to as a sending node.

In Step 203, an arbitration request is broadcast by the node. In one or more embodiments of the invention, the arbitration request may be broadcast using an optical signal having a node-specific wavelength. Moreover, the optical signal carrying/representing the arbitration request may be placed on the lower arbitration link operatively connecting all nodes within the arbitration domain having the receiving node. In one or more embodiments of the invention, the arbitration request contains a node identifier of the receiving node. For example, if node B is sending data to node H, then the arbitration request may include the node identifier of node H and may be sent using an optical signal having the wavelength designated to node B.

In Step 205, arbitration requests are received from all sending nodes (i.e., nodes requesting to send packets) within the arbitration domain. In one or more embodiments of the invention, the arbitration requests are fed into the node from the lower arbitration link using a power splitter. As the lower arbitration link has multiple power splitters connected to the lower arbitration link, proportionally less power may be visible to each successive power splitter connected to the lower arbitration link. In one or more embodiments of the invention, to ensure that each node receives the arbitration requests, optical power of the arbitration messages may be increased or the bit rate of arbitration messages may be decreased. In one or more embodiments of the invention, the bit rate may be decreased to 1/N for an N×N data network.

In Step 207, the sending nodes in the arbitration domain are identified from the multiple received arbitration requests. As discussed above, each arbitration request is sent using an optical signal having a wavelength specific to the sending node. Accordingly, the wavelengths of the incoming optical signals may be used to identify the sending nodes. Further, as an arbitration request includes an identifier of the receiving node, each node receiving arbitration requests knows which arbitration domain is being arbitrated.

In Step 209, it is determined whether the arbitration interval has elapsed. In one or more embodiments of the invention, a central clock ensures that each node starts and stops the same time periods (e.g., arbitration interval, sending interval, arbitration slots) at the same time. Accordingly, the end of the arbitration interval is identified at the same time by each of the nodes in the arbitration domain. In one or more embodiments of the invention, the length of the arbitration interval is long enough to ensure that all arbitration requests sent at the start of the arbitration interval are received by all of the nodes in the arbitration domain. When it is determined that the arbitration interval has elapsed, the process proceeds to Step 211. When it is determined that the arbitration interval has not elapsed, the process returns to Step 205.

In Step 211, an upcoming time slot is assigned to each sending node. Specifically, time slots are allocated to sending nodes according to the priority assigned to each sending node. In one or more embodiments of the invention, the respective priority of each sending node is dictated by a data structure universal to all nodes within the arbitration domain. As discussed above, the data structure includes a pointer identifying the node with the highest priority within the arbitration domain. The priorities of the remaining nodes are also determined based on the pointer location within the data structure. If the node itself is a sending node, then the node also assigns itself to a time slot according to its priority. In one or more embodiments of the invention, all arbitration requests sent during the arbitration interval are assigned time slots. Further, once all the arbitration requests are assigned time slots, the pointer within the data structure is updated (e.g., incremented), effectively changing the priorities of the nodes within the arbitration domain for the next arbitration interval.

In one or more embodiments of the invention, each sending node records its allocated time slot in order to transmit a switch request to the receiving node and the data to the receiving node at the appropriate time. In one or more embodiments of the invention, all assigned time slots are tracked by a single node within the arbitration domain. The single node may be located within the same column as the receiving node. Further, the single node may transmit the switch request to the receiving node on behalf of the sending node.

FIG. 7 shows a flowchart for sending data in accordance with one or more embodiments of the invention. In the process of FIG. 7, the sending node sends both the switch request and the data. Initially, it is determined whether the node is assigned to the current time slot (Step 221). As discussed above, each sending node records the time slots it has been allocated. As also discussed above, a clock establishes the end of one time slot and the start of the next time slot. When it is determined that the node is assigned to the current time slot, the process proceeds to Step 223. When it is determined that the node is not assigned to the current time slot, the process proceeds to Step 227.

In Step 223, the node sends a switch request to the receiving node. As discussed above, the sending node and the receiving node are linked by an upper arbitration link and a column arbitration link. The upper arbitration link and the column arbitration link are connected using a drop filter tuned to a specific wavelength, or a small range of wavelengths. In one or more embodiments of the invention, the switch request is sent on the upper arbitration link using an optical signal having the specific wavelength. Thus, the drop filter on the column arbitration link redirects the switch request to the column arbitration link. Further, the switch request includes a row identifier of the receiving node. In one or more embodiments of the invention, all nodes connected to the column arbitration link receive the switch request, but only one node in the row identified by the switch request turns on the switch connected to the data network to receive the data. Multiple switch requests to the same data slot to different nodes in the same column can be broadcast as a single request along the column arbitration waveguide.

In Step 225, the sending node transmits the data to the receiving node. Specifically, the sending node places the data on the data network. In one or more embodiments of the invention, the sending node delays transmission of the data in order to buffer time for the switch request to arrive at the receiving node and/or for the receiving node to activate the correct switch and thus, receive the data.

After Step 221 or Step 225, the process proceeds to Step 229 and then Step 221 (i.e., the process executes in a loop). Alternatively, execution of the process may be ended (e.g., by a user) (i.e., Step 227). In one or more embodiments of the invention, Step 227 is omitted. In such embodiments, Step 229 is immediately executed following Step 221 or Step 225.

FIG. 8 shows a flowchart for sending data to a receiving node in accordance with one or more embodiments of the invention. In the process of FIG. 8, the node transmitting the switch request and the node transmitting the data (i.e., sending node) are different. Specifically, although both the sending node and the node transmitting the switch request are within the same arbitration domain, the node transmitting the switch request is located within the same column as the receiving node. In other words, the node transmitting the switch request is assigned to the column arbitration link connected to the receiving node.

Initially, the node determines whether it is assigned to the column of the receiving node (Step 231). When the node determines it is assigned to the column of the receiving node, the process proceeds to Step 233. When the node determined it is not assigned to the column of the receiving node, the process proceeds to Step 235. In one or more embodiments of the invention, if the arbitration domain corresponds to a data channel that only connects the nodes in the arbitration domain to a set of receiving nodes in a single node column, then a single node assigned to the column arbitration link connected to the node column sends all switch requests for the arbitration domain.

In Step 233, the node sends a switch request to the receiving node to receive data. The switch request may be sent as discussed above with reference to FIG. 7 and Step 223. As also discussed above, multiple switch requests to the same data slot to different nodes in the same column can be broadcast as a single request along the column arbitration waveguide.

In Step 235, it is determined whether the node is assigned to the current time slot. In other words, it is determined whether the node is allocated the current time slot to transmit data. When it is determined that the node is assigned to the current time slot, the process proceeds to Step 237. When it is determined that the node is not assigned to the current time slot, the process proceeds to Step 239. Step 235 may be essentially the same as Step 221, discussed above in reference to FIG. 7.

In Step 237, the sending node transmits the data to the receiving node. Specifically, the sending node places the data on the data network. In one or more embodiments of the invention, the sending node delays transmission of the data in order to buffer time for the switch request to arrive at the receiving node and/or for the receiving node to active the correct switch and thus, receive the data. In one or more embodiments of the invention, the sending node transmits the data on the data network before the receiving node activates the switch. However, the switch is activated before the data arrives at the switch (i.e., the switch is activated while the data is in transit from the sending node to the receiving node).

After Step 235 or Step 237, the process proceeds to Step 241 and then Step 231 (i.e., the process executes in a loop). Alternatively, execution of the process may be ended (e.g., by a user) (i.e., Step 239). In one or more embodiments of the invention, Step 239 is omitted. In such embodiments, Step 241 is immediately executed following Step 235 or Step 237.

Figure 9:
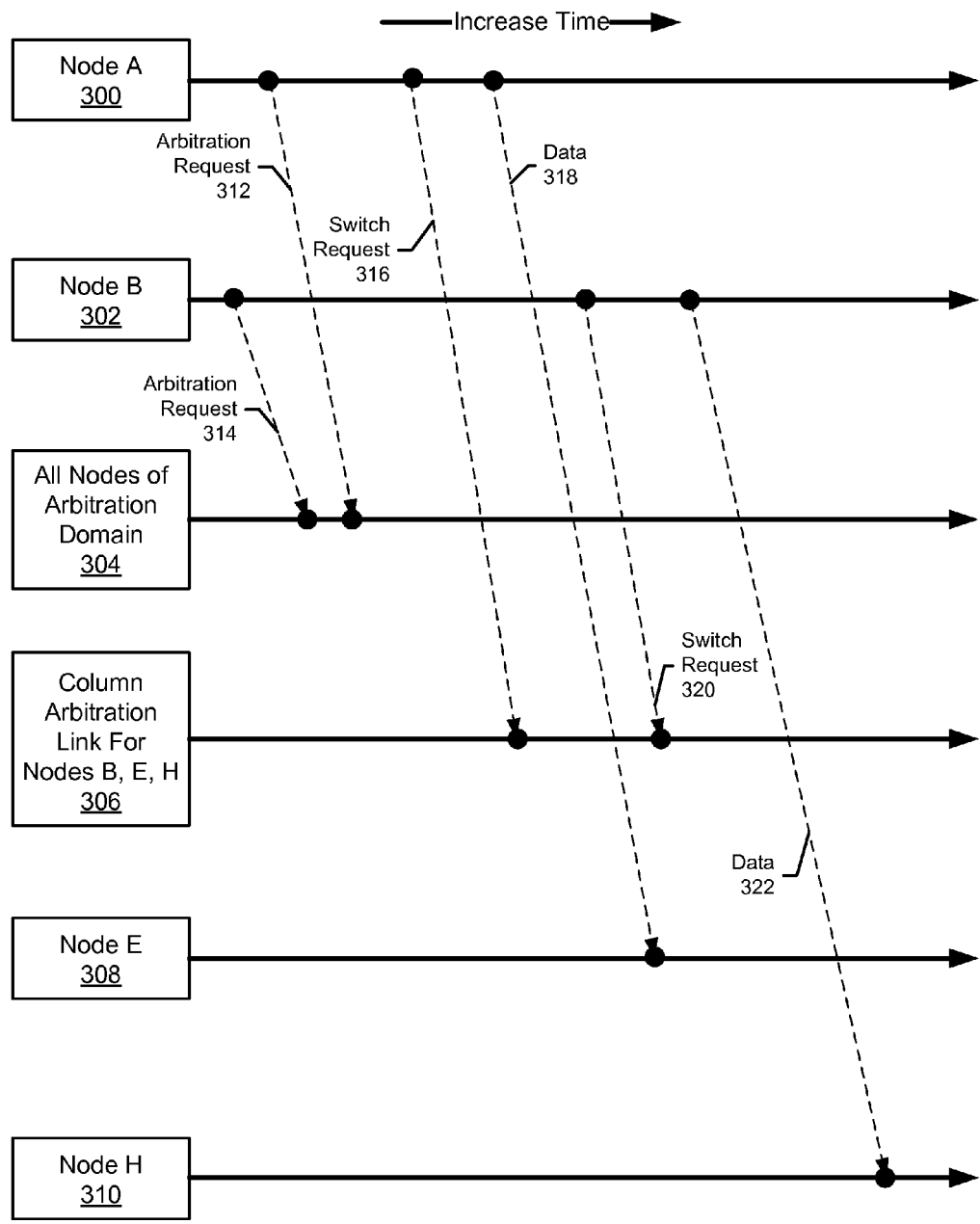
FIGS. 9 and 10 show example timing diagrams in accordance with one or more embodiments of the invention.
Figure 10:
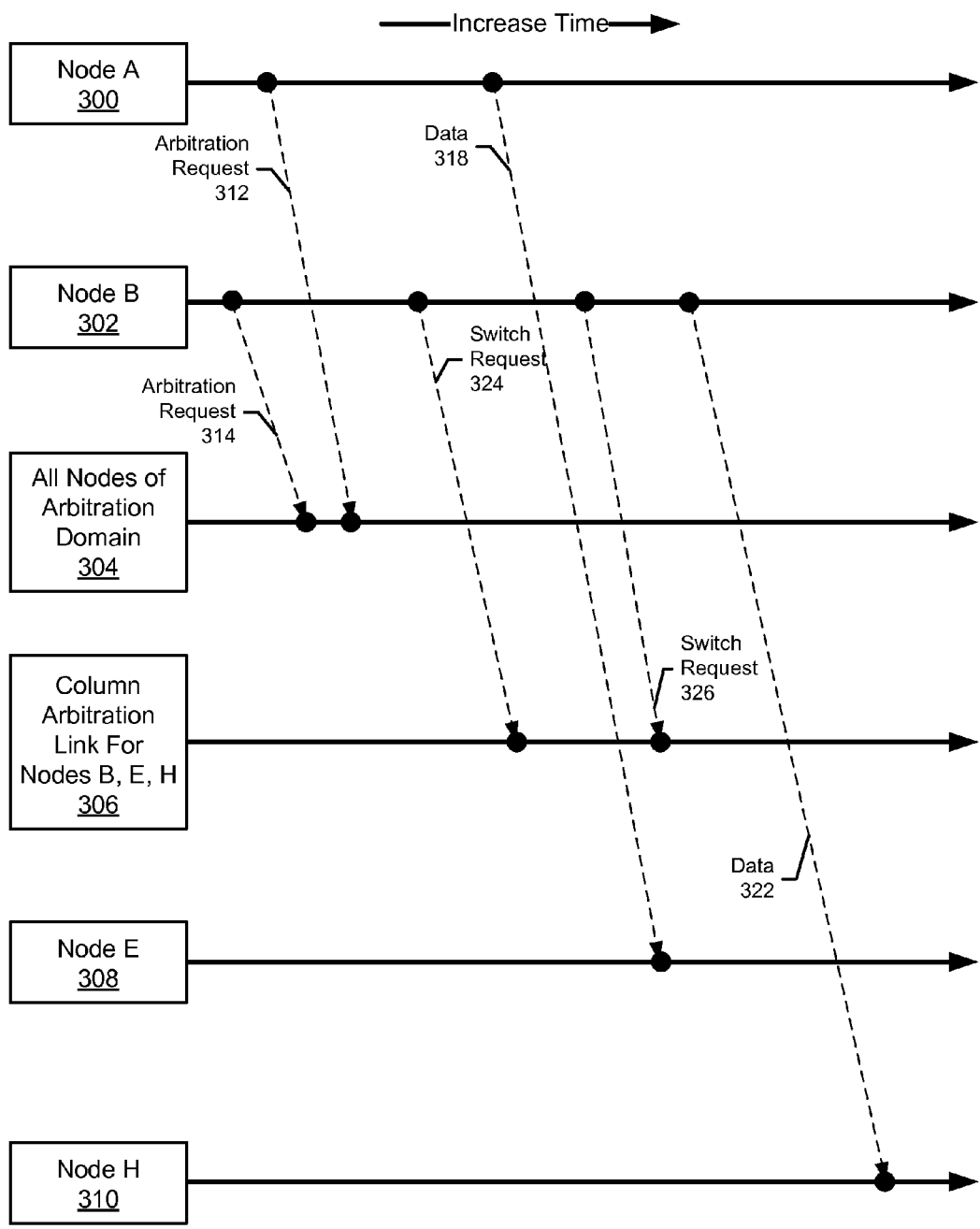

FIGS. 9 and 10 show example timing diagrams in accordance with one or more embodiments of the invention. The following examples are for explanatory purposes only and not intended to limit the scope of the invention.

In the examples, consider the scenario in which the data network corresponds to the data network shown in FIG. 1. Moreover, consider the scenario in which an integrated circuit has a three by three array of nodes. Further, in the examples shown in FIGS. 9 and 10, node A (300) and node B (302) are members of an arbitration domain (304) including node A (300), node B (302), and node C (not shown). The data channel corresponding to the arbitration domain (304) is used to send data to a set of receiving nodes (306) that contains node B (302), node E (308), and node H (310). Further, in the example both node A (300) and node B (302) want to send data to node E (308) and node H (310), respectively, during a sending interval.

FIG. 9 shows an example in which the sending node sends the switch request to the receiving node. In one or more embodiments of the invention, node A (300) sends an arbitration request (312) on the lower arbitration link. Similarly, node B (302) sends an arbitration request (314) on the lower arbitration link. In one or more embodiments of the invention, the arbitration requests are sent during an arbitration interval.

In one or more embodiments of the invention, all nodes in the arbitration domain (304) receive the arbitration requests on the lower arbitration link. Thus, node A (300) receives the arbitration request (314) from node B (302) and node B (302) receives the arbitration request (312) from node A (300). As both node A (300) and node B (302) have the same data structure with the same pointer identifying the node of highest priority in the arbitration domain (e.g., node A (300) in the example), both node A (300) and node B (302) allocate to the first time slot to node A (300) and the subsequent time slot to node B (302). Additionally, node A (300) and node B (302) update the pointer to their respective data structures to refer to node C as the next node.

After the arbitration interval has elapsed, sending nodes in the arbitration domain send switch requests and data to their respective receiving node(s). For example, at the time slot assigned to node A (300), node A sends a switch request (316) on the upper arbitration link. In one or more embodiments of the invention, the switch request is sent using an optical signal having a predetermined wavelength. A drop filter located on the column arbitration link connected to nodes B, E, and H (306) is tuned to select and redirect the optical signal having the predetermined wavelength from the upper arbitration link to the column arbitration link. Moreover, because the drop filter is the only drop filter connected to the upper arbitration domain that redirects the wavelength, only the column arbitration waveguide of the receiving nodes receives the switch request (316).

In one or more embodiments of the invention, the switch request (316) includes a row identifier of node E (308), the receiving node in the example. Accordingly, node E (308) receives the switch request and switches on the input switch to receive data from node A (300). Next, node A (300) sends data (318) to node E (308). Because node E (308) received the switch request, node E receives the data (318).

In one or more embodiments of the invention, while the data is transmitted to node E (308), node B (302) starts sending a switch request (320) on the upper arbitration link. Because of the delay in sending the switch request and data, even though the switch request is sent before the data (318) is received by node E (308), node H (310) does not turn on the switch linking node H (310) to the data network until after the data is received by node E (308).

In one or more embodiments of the invention, like the switch request (316) sent by node A (300), the switch request (320) sent by node B (302) is sent using an optical signal having the predefined wavelength. Accordingly, the optical signal carrying/representing the switch request is redirected by the drop filter located on the column arbitration link connected to nodes B, E, and H (306). In one or more embodiments of the invention, the switch request (320) includes a row identifier of node H (310). Accordingly, node H (310) receives the switch request (320) and switches on the input switch to receive the data (322) from node B (302). With the arbitration, node A (300) and node B (302) are able to quickly and effectively ensure that data is received at the receiving nodes.

FIG. 10 shows an example timing diagram in which all switch requests are sent by a single node within the arbitration domain on behalf of the sending nodes. Specifically, the single node is assigned to the column having the receiving node(s) (e.g., the single node is located in the same column as the receiving nodes(s)). In the example of FIG. 10, the single node is node B (302). In other words, node B (302) is located in the same column as node E (308) and node H (310). As shown in the example timing diagram, both nodes A (300) and node B (302) send an arbitration request on the lower arbitration link. Accordingly, all nodes in the arbitration domain (304) receive the arbitration requests and assign time slots in essentially the same manner as discussed above in reference to FIG. 9.

However, because node B (302) is associated with the column having node E (308) and node H (310) (e.g., node B (302) is located within the same column as node E (308) and node H (310)), node B (302) sends a switch request (324) on behalf of node A (300) to node E (308). Node A (300) sends data (318) to node E (308) at the time slot designated to node A (300). Similarly, node B (302) sends a switch request (326) to node H (310). Node B (302) then sends data to node H (310). In one or more embodiments of the invention, because the nodes use the same clock and are assigned time slots based on the clock, node A (300) is assured that by the time node E (308) receives the data from node A (300), the switch connected to node E (308) is configured to redirect data from the data link to node E (308).

Figure 11:
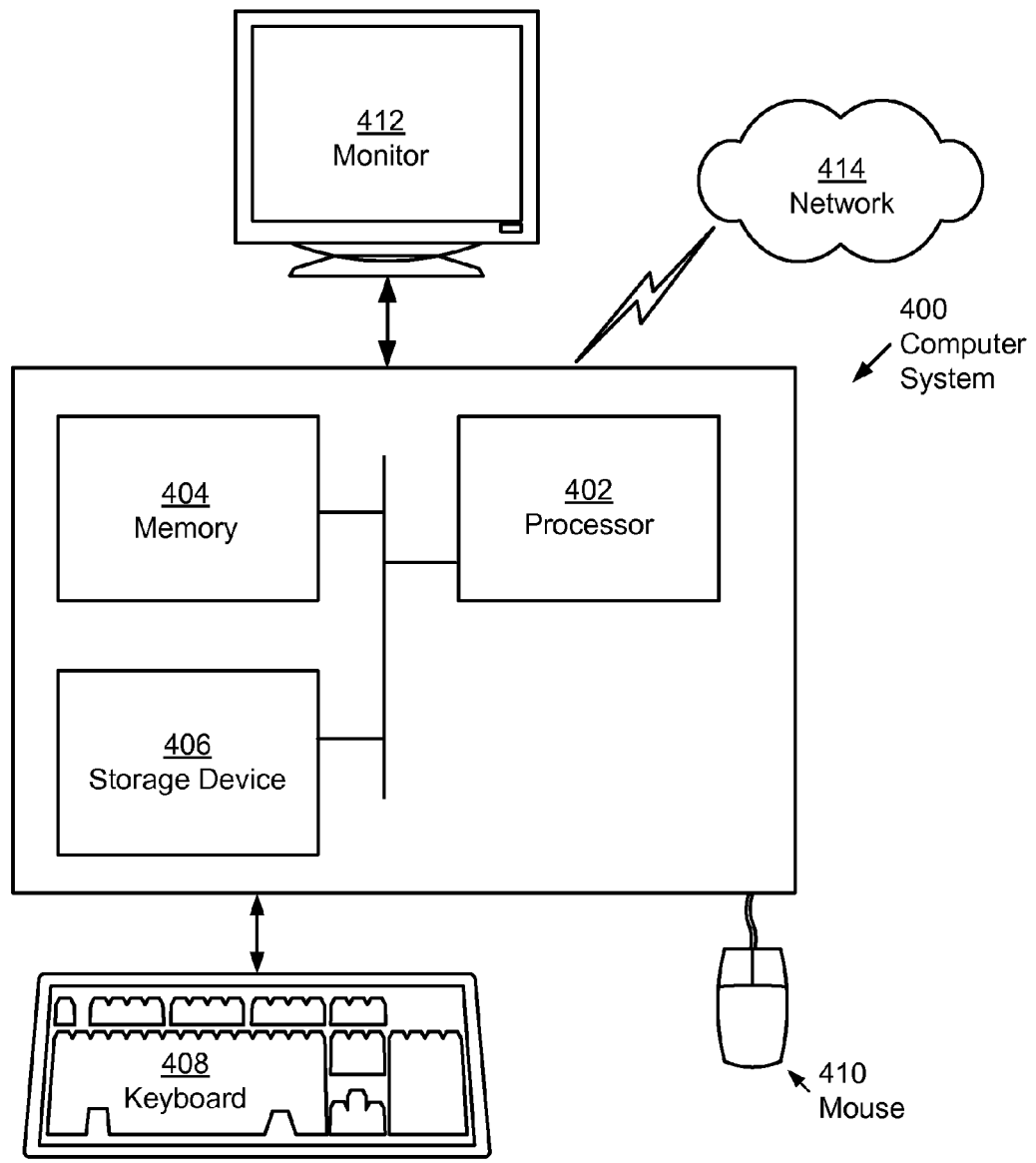
FIG. 11 shows a computer system in accordance with one or more embodiments of the invention.

Embodiments of the invention may be implemented on virtually any type of computer regardless of the platform being used. For example, as shown in FIG. 11, a computer system (400) includes one or more processor(s) (402) (such as a central processing unit (CPU), integrated circuit, etc.), associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer system (400) may also include input means, such as a keyboard (408), a mouse (410), or a microphone (not shown). Further, the computer system (400) may include output means, such as a monitor (412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for arbitration in an arbitration domain, comprising: receiving, by each node of a plurality of nodes in the arbitration domain, an arbitration request from each sending node of the plurality of nodes in the arbitration domain, wherein the plurality of nodes in the arbitration domain each use a shared data channel to send data to a set of receiving nodes, wherein the arbitration request to each receiving node of the plurality of nodes in the arbitration domain is transmitted via a first arbitration waveguide of an arbitration network, wherein the arbitration domain comprises the plurality of nodes that are configured to transmit on the shared data channel, and wherein each sending node is a node in the plurality of nodes having data to transmit on the shared data channel; by each node of the plurality of nodes in the arbitration domain, independently assigning a time slot to each sending node, wherein the time slot is assigned according to a plurality of priorities pre-assigned to the plurality of nodes in the arbitration domain; for each time slot: sending, from the arbitration domain, a switch request to a receiving node designated by the sending node, wherein the receiving node is in the set of receiving nodes, wherein the switch request is transmitted via a second arbitration waveguide of the arbitration network; wherein the switch request is sent by a column node of the plurality of nodes in the arbitration domain, and wherein the column node is assigned to the column connected to the receiving node; and sending, by the sending node, data to the receiving node via the shared data channel during the time slot.

2. The method of claim 1, wherein the switch request is sent by the sending node.

3. The method of claim 1, wherein the column node is located at an intersection of the column and a row, and wherein the row comprises the column node and the sending node.

4. The method of claim 1, wherein the plurality of nodes in the arbitration domain are located in a single row.

5. The method of claim 1, wherein the plurality of nodes are each associated with a plurality of arbitration domains, wherein a separate arbitration domain of the plurality of arbitration domains exists for each group of receiving nodes, and wherein each receiving node in the group of receiving nodes receives data from each of the plurality of nodes in the arbitration domain on a same data channel.

6. The method of claim 5, wherein the group of receiving nodes corresponding to the arbitration domain comprises all nodes in a single column.

7. The method of claim 5, wherein the group of receiving nodes corresponding to an arbitration domain corresponds to a single node.

8. A system for arbitration in an arbitration domain, comprising: a set of receiving nodes comprising a receiving node configured to receive data; an arbitration domain comprising a plurality of nodes having a shared data channel to send the data to the set of receiving nodes, wherein the plurality of nodes in the arbitration domain is configured to: receive, by each node of the plurality of nodes in the arbitration domain, an arbitration request from each sending node of the plurality of nodes in the arbitration domain, wherein the arbitration domain comprises the plurality of nodes that are configured to transmit on the shared data channel, and wherein each sending node is a node in the plurality of nodes having data to transmit on the shared data channel; by each node of the plurality of nodes in the arbitration domain: independently assign a time slot to each sending node, wherein the time slot is assigned according to a plurality of priorities pre-assigned to the plurality of nodes in the arbitration domain; for each time slot: send, from the arbitration domain, a switch request to the receiving node designated by the sending node; wherein the switch request is sent by a column node of the plurality of nodes in the arbitration domain, and wherein the column node is assigned to the column connected to the receiving node; and send, by the sending node, the data to the receiving node via the shared data channel during the time slot, a first arbitration waveguide of an arbitration network configured to transmit the arbitration request from each sending node of the plurality of nodes in the arbitration domain to each receiving node of the plurality of nodes in the arbitration domain; and a second arbitration waveguide of the arbitration network configured to transmit the switch request.

9. The system of claim 8, wherein the second arbitration waveguide comprises a wavelength selection switch for each sending node, wherein the switch request is sent by the sending node, and wherein sending the switch request comprises: selecting a wavelength corresponding to the column comprising the receiving node to obtain a selected wavelength, and sending the switch request in the selected wavelength, wherein a drop filter connected to the column is configured to transmit the switch request to a column comprising the receiving node when the switch request is in the selected wavelength.

10. The system of claim 8, wherein the second arbitration waveguide comprises a first drop filter for each of the plurality of nodes in the arbitration domain, wherein the switch request is sent by a column node of the plurality of nodes in the arbitration domain, wherein the column node is assigned to a column comprising the receiving node, and wherein sending the switch request comprises: sending the switch request in a wavelength corresponding to the first drop filter connected to the sending node, and wherein a second drop filter connected to the column is configured to transmit the switch request to the column when the switch request is in the wavelength corresponding to the first drop filter connected to the sending node.

11. The system of claim 8, wherein the first arbitration waveguide comprises a wavelength selection switch for each sending node, and wherein each sending node sends the arbitration request by: selecting a wavelength corresponding to a sending node to obtain a selected wavelength, and sending the arbitration request in the selected wavelength, wherein the arbitration request comprises a column identifier of a column comprising the receiving node.

12. The system of claim 8, wherein the first arbitration waveguide comprises a drop filter for each sending node, and wherein each sending node transmits the arbitration request on a lower arbitration waveguide by: selecting a wavelength corresponding to the drop filter to obtain a selected wavelength; and sending the arbitration request to the drop filter in the selected wavelength, wherein the first arbitration waveguide is the lower arbitration waveguide.

13. The system of claim 8, wherein the plurality of nodes are each associated with a plurality of arbitration domains, wherein a separate arbitration domain of the plurality of arbitration domains exists for each group of receiving nodes, and wherein each receiving node in the group of receiving nodes receives data from each of the plurality of nodes in the arbitration domain on a same data channel.

14. The system of claim 13, wherein the group of receiving nodes corresponding to the arbitration domain comprises all nodes in a single column.

15. The system of claim 13, wherein the group of receiving nodes corresponding to an arbitration domain corresponds to a single node.

16. An integrated circuit, comprising: a set of receiving nodes comprising a receiving node configured to receive data; an arbitration domain comprising a plurality of nodes having a shared data channel to send the data to the set of receiving nodes, wherein the plurality of nodes in the arbitration domain is configured to: receive, by each node of the plurality of nodes in the arbitration domain, an arbitration request from each sending node of the plurality of nodes in the arbitration domain, wherein the arbitration domain comprises the plurality of nodes that are configured to transmit on the shared data channel, and wherein each sending node is a node in the plurality of nodes having data to transmit on the shared data channel; by each node of the plurality of nodes in the arbitration domain: independently assign a time slot to each sending node, wherein the time slot is assigned according to a plurality of priorities pre-assigned to the plurality of nodes in the arbitration domain; for each time slot: send, from the arbitration domain, a switch request to the receiving node designated by the sending node; wherein the switch request is sent by a column node of the plurality of nodes in the arbitration domain, and wherein the column node is assigned to the column connected to the receiving node; and send, by the sending node, the data to the receiving node via the shared data channel during the time slot, a first arbitration waveguide of an arbitration network configured to transmit the arbitration request from each sending node of the plurality of nodes in the arbitration domain to each receiving node of the plurality of nodes in the arbitration domain; and a second arbitration waveguide of the arbitration network configured to transmit the switch request.

17. The integrated circuit of claim 16, wherein the second arbitration waveguide comprises a first drop filter for each of the plurality of nodes in the arbitration domain, wherein the switch request is sent by a column node of the plurality of nodes in the arbitration domain, wherein the column node is assigned to a column comprising the receiving node, and wherein sending the switch request comprises: sending the switch request in a wavelength corresponding to the first drop filter connected to the sending node, and wherein a second drop filter connected to the column is configured to transmit the switch request to the column when the switch request is in the wavelength corresponding to the first drop filter connected to the sending node.

* * * * *

UNITED STATES PATENT AND TRADEMARK OFFICE
CERTIFICATE OF CORRECTION

PATENT NO. : 8,824,496 B2  
APPLICATION NO. : 12/610124  
DATED : September 2, 2014  
INVENTOR(S) : Koka et al.

Page 1 of 1

It is certified that error appears in the above-identified patent and that said Letters Patent is hereby corrected as shown below:

In the Specification,

In column 1, line 13, after "close in" delete "on".

In the Claims,

In column 15, line 66, in Claim 8, delete "slot," and insert -- slot; --, therefor.

Signed and Sealed this
Tenth Day of March, 2015

Michelle K. Lee
*Deputy Director of the United States Patent and Trademark Office*